Patented June 1, 1937

2,082,192

UNITED STATES PATENT OFFICE 2,082,192

ACID WOOL DYESTUFFS OF THE ANTHRAQUINONE SERIES

Klaus Weinand, Leverkusen-I. G. Werk, and Curt Bamberger, Cologne-Mulheim, Germany, assignors to General Aniline Works, Inc., New York, N. Y., a corporation of Delaware No Drawing. Application March 7, 1936, Serial No. 67,732. In Germany March 15, 1935

4 Claims. (Cl. 260—60)

The present invention relates to new acid wool dyestuffs of the anthraquinone series.

The new dyestuffs which are obtainable in accordance with our present invention are 1-amino-4-arylaminoanthraquinone-2-sulfonic acids, wherein the aryl group is of the benzene series and contains two representatives of the following substituents:

Acetyl amino groups,
Carbon amide groups and the
Nitrile group.

This invention is based on the discovery that the presence of two representatives of the above mentioned substituents in the aryl amino group induces outstanding equalizing properties. The new dyestuffs dye wool from an acid bath very equal red to greenish blue shades. As to the carbon amide groups such residues are preferred as contain lower alkyl groups; the best results are obtained with the carbondimethylamide group.

These new products can be prepared according to usual methods, for instance, by causing 1-amino-4-bromoanthraquinone-2-sulfonic acids to react upon aniline derivatives which contain two of the above mentioned substituents. Another method of working consists in first preparing the reaction products of one mol. of 1-amino-4-bromoanthraquinone-2-sulfonic acids with one mol. of a diamine which contains only one of the said substituents, the second substituent being subsequently introduced, for instance, by acetylating the still present free amino group.

The following examples illustrate the invention, without, however, restricting it thereto, the parts being by weight:—

Example 1

10 parts of 1-amino-4-bromoanthraquinone-2-sulfonic acid dissolved in 150 parts of water are heated together with 10 parts of aminobenzene-3,5-dicarboxylic acid dimethylamide, 12 parts of sodium bicarbonate and 0.5 part of cuprous chloride to 60–80° C. until the red solution has turned to blue. On cooling or by the addition of sodium chloride the dyestuff is precipitated, sucked off and rinsed by redissolving from water. It represents blue needles which dye wool from an acid bath reddish-blue shades. A similar dyestuff is obtained when replacing in the reaction mixture described above the aminobenzene-3,5-dicarboxylic acid dimethylamide by aminobenzene dicarboxylic acid monomethylamide.

Example 2

10 parts of 1-amino-4-bromoanthraquinone-2-sulfonic acid dissolved in 100 parts of water are heated with the addition of 10 parts of sodium bicarbonate, 0.5 part of cuprous chloride and 15 parts of 1-amino-4-acetylamino-3-carboxylic acid dimethylamide to 60–80° C. until the color of the reaction mixture has turned to blue. As soon as the color of the solution no longer changes the dyestuff is precipitated by means of sodium chloride, sucked off and rinsed by redissolving from water. It represents blue needles which dye wool from an acid bath even blue shades of good equalizing properties. This dyestuff is somewhat more green when compared with that of Example 1.

Similar results are obtained by the employment of 1-amino-5-acetylamino-3-carboxylic acid dimethylamide the dyestuff obtainable thereby showing a somewhat more reddish shade.

Example 3

10 parts of 1-amino-4-bromoanthraquinone-2-sulfonic acid dissolved in 150 parts of water are heated with the addition of 20 parts of 2,4-diaminobenzene nitrile, 15 parts of potassium bicarbonate and 0.5 part of cuprous chloride to 50–60° C., advantageously in an inert medium such as carbon dioxide or nitrogen, until the color of the reaction mixture has turned to blue. On cooling the 1-amino-4-(3'-amino-4'-cyano) anilidoanthraquinone-2-sulfonic acid formed is precipitated and sucked off. The cake is suspended in 100 parts of a 10% pyridine water, acetic anhydride being added thereto at 70–80° C. until the free amino group still present in the anilido residue has been acetylated; this stage is reached as soon as a test portion taken therefrom no longer turns to red on the addition of hydrochloric acid. The dyestuff is dissolved in pyridine water and precipitated by the addition of hydrochloric acid and sodium chloride. It dyes wool even reddish-blue shades.

Example 4

45 parts of the sodium salt of 1-amino-4-bromoanthraquinone-2-sulfonic acid and 30 parts of 3,5-diacetylamino aniline are stirred for several hours at 70–80° C. in an aqueous solution containing 20 parts of sodium bicarbonate and 0.5 part of cuprous chloride. The dyestuff formed is isolated from the blue solution and, if necessary, purified by redissolving it. It is soluble in concentrated sulfuric acid with a weakly blue coloration which turns to green by the addition of paraformaldehyde. The dyestuff dyes wool from an acid bath even clear blue shades. A dyestuff of similar properties is obtained from 2,4-diacetylamino aniline.

We claim:—

1. 1-amino-4-arylaminoanthraquinone-2-sulfonic acids wherein the aryl group is of the benzene series and contains two substituents selected from the group consisting of the class of acetylamino, carbonamide- and nitrile groups.

2. The products as claimed in claim 1 wherein the carbonamide group is a dimethylcarbonamide group.

3. 1-amino-4-(3',5'-carbondimethylamido)-anilido-2-sulfonic acid.

4. 1-amino-4-(3'-carbondimethylamido-4'-acetylamino)-anilido-2-sulfonic acid.

KLAUS WEINAND.
CURT BAMBERGER